United States Patent
Iverson et al.

(10) Patent No.: US 10,394,221 B2
(45) Date of Patent: Aug. 27, 2019

(54) 3D PRINTING USING 3D VIDEO DATA

(71) Applicant: Microsoft Technology Licensing, LLC, Redmond, WA (US)

(72) Inventors: Kristofer N. Iverson, Redmond, WA (US); Patrick John Sweeney, Woodinville, WA (US); William Crow, Sequim, WA (US); Dennis Evseev, Seattle, WA (US); Steven Craig Sullivan, Clyde Hill, WA (US); Alvaro Collet Romea, Seattle, WA (US); Ming Chuang, Bellevue, WA (US); Zheng Wang, Redmond, WA (US); Emmett Lalish, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 330 days.

(21) Appl. No.: 15/235,514

(22) Filed: Aug. 12, 2016

(65) Prior Publication Data
US 2018/0046167 A1      Feb. 15, 2018

(51) Int. Cl.
| | |
|---|---|
| *G06K 9/00* | (2006.01) |
| *G06T 7/73* | (2017.01) |
| *G06T 17/00* | (2006.01) |
| *G06T 19/20* | (2011.01) |
| *G05B 19/4099* | (2006.01) |

(52) U.S. Cl.
CPC ..... *G05B 19/4099* (2013.01); *G06K 9/00201* (2013.01); *G06T 7/73* (2017.01); *G06T 17/00* (2013.01); *G06T 19/20* (2013.01); *G05B 2219/49023* (2013.01); *G06T 2207/10016* (2013.01); *G06T 2207/10028* (2013.01); *G06T 2219/2021* (2013.01)

(58) Field of Classification Search
CPC .................. G06T 19/20; G06T 2219/2021
See application file for complete search history.

(56) References Cited

U.S. PATENT DOCUMENTS

| | | |
|---|---|---|
| 2015/0057783 A1 | 2/2015 | Rossi |
| 2016/0150217 A1 | 5/2016 | Popov |

OTHER PUBLICATIONS

Gilpin, Lyndsey, "The missing link in 3D printing: User-friendly software", Apr. 2004, Tech Republic (Year: 2014).*

(Continued)

*Primary Examiner* — Amar Movva

(57) ABSTRACT

Systems, devices, and methods are described herein for transforming three dimensional (3D) video data into a 3D printable model. In one aspect, a method for transforming 3D video data may include receiving 3D video data indicated or selected for 3D printing. The selected portion or 3D video data, which may include a frame of the 3D video data, may be repaired or modified to generate a 3D model that define at least one enclosed volume. At least one of the enclosed volumes of the 3D video data may be re-oriented based on at least one capability of a target 3D printing device. In some aspects, the re-orienting may be performed to optimize at least one of a total print volume or print orientation of the at least one enclosed volume. In some aspects, the method may be performed in response to a single selection or action performed by a user.

20 Claims, 9 Drawing Sheets

(56) References Cited

OTHER PUBLICATIONS

Jung, Jin Woo, Lee, Jung-Seob, and Cho, Dong-Woo, "Computer-aided multiple-head 3D printing system for printing of heterogeneous organ/tissue constructs", Feb. 2016, Nature (Year: 2014).*
U.S. Appl. No. 15/178,364, filed Jun. 9, 2016, Iverson et al.
"International Search Report and Written Opinion Issued in PCT Application No. PCT/US2017/045817", dated Oct. 4, 2017, 13 Pages.
Smolic, et al., "3D Video Objects for Interactive Applications", In Proceedings of the 13th European Signal Processing Conference, Sep. 4, 2005, 4 Pages.

\* cited by examiner

3D PRINTING USING 3D VIDEO DATA

TECHNICAL FIELD

This disclosure relates generally to three dimensional (3D) modeling, and more specifically to transforming 3D video data to be generated using a 3D generation device or 3D printing device.

BACKGROUND

The generation, display, and access of three dimensional (3D) video is ever increasing due to advances in 3D modeling technology, mobile device technology, and a number of other factors. Techniques for using this data, however, for example for modification or for other applications, such as generating one or more 3D objects based on the 3D video, are not readily available. For example, it is not readily possible currently to 3D print 3D video data without a toolchain of software tools able to extract and transform the 3D data into something suitable for 3D printing. Generally, 3D video data is not formatted for 3D printing and not inherently printable, for example, because the video stream is fundamentally just an index into a set of frames and does not define 3D objects in a way usable by 3D printing or generation devices. Accordingly, improvements in 3D modeling and transformation for various applications, such as 3D printing, can be made.

SUMMARY

Illustrative examples of the disclosure include, without limitation, methods, systems, and various devices. In one aspect, techniques for transforming three dimensional (3D) video data into a 3D printable model may include receiving 3D video data indicated or selected for 3D printing. The selected portion or 3D video data, which may include a frame of the 3D video data, may be repaired or modified to define at least one enclosed volume. At least one of the enclosed volumes of the 3D video data may then be re-oriented based on at least one capability of a target 3D printing device. In some aspects, the re-orienting may be performed to optimize at least one of a total print volume or print orientation of the at least one enclosed volume.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
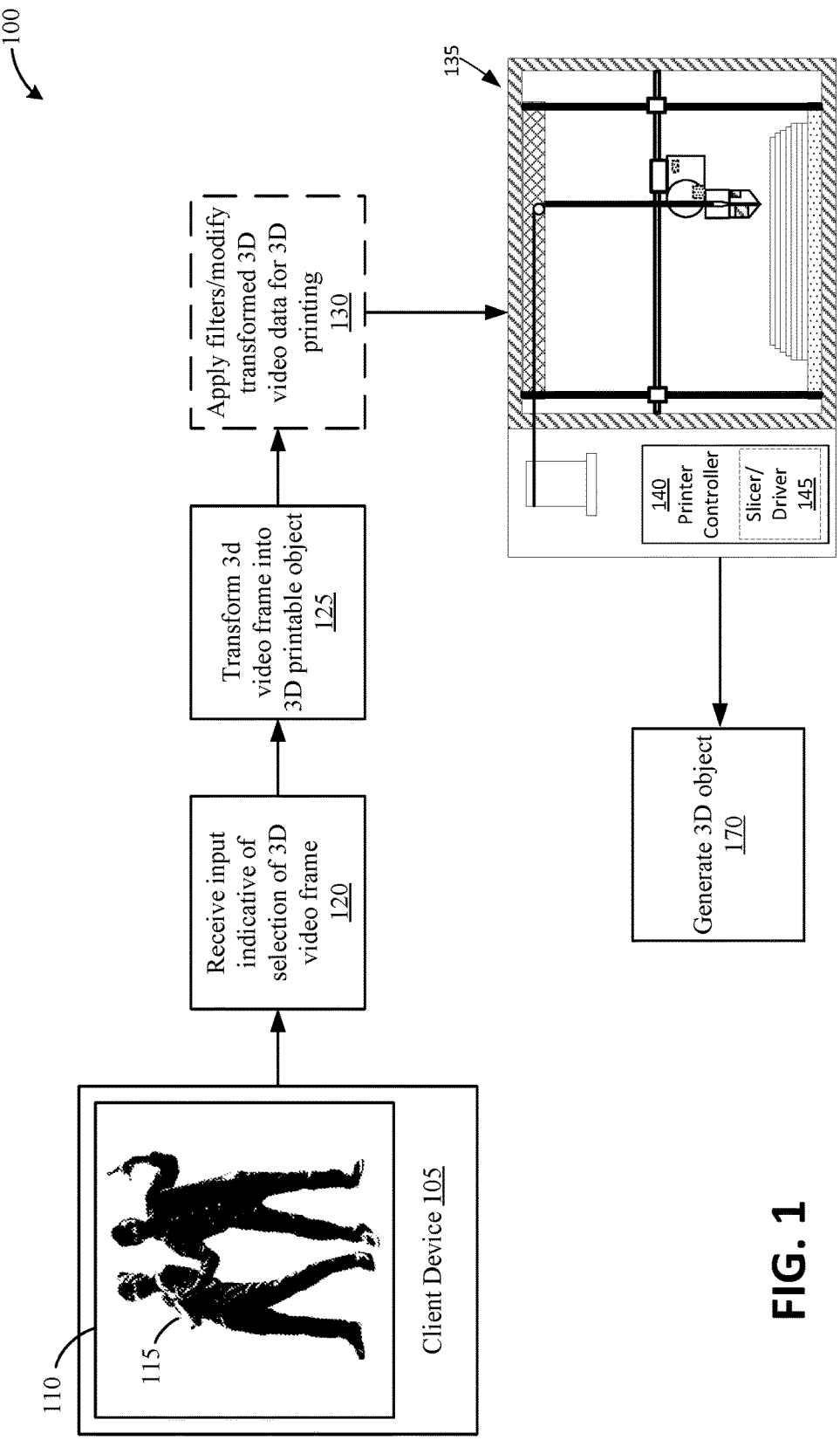
FIG. 1 depicts an example system and process for generating a 3D object or model based on a selection of 3D video.

Systems and techniques are described herein for transforming three dimensional (3D) video data into a 3D printable model. In one aspect, 3D video data may be received for 3D generation. In some aspects, the 3D video data may be received through a selection via a user interface associated with a 3D video player, such as through selection of one or more frames of the 3D video data. In some aspects, for example, when the 3D video data or frame does not define complete 3D objects, the 3D video data may be modified or repaired to define one or more fully-defined 3D objects, such that enclose one or more volumes. Next, at least one of the objects or enclosed volumes may be re-oriented based on one or more capabilities of a target device, such as a target 3D printing device or 3D printer. In some aspects, the re-orienting may be performed to optimize a total print volume or print orientation of the 3D video data, for example, to enable the target 3D printing device to accurately and completely generate a 3D model or object based on the 3D video data. The optimization may be performed to conform to the limits or capabilities of the 3D printing device, such as total print volume or print dimensions. In some aspects, the print orientation of at least one of the enclosed volumes or objects of the 3D video data may be optimized, for example, to reduce material required to generate the 3D model, better arrange the supports needed to generate the model, for example, for better structural integrity, and for other ends as will be described in greater detail below.

In one aspect, a new type of processing or preprocessing can be applied to 3D video data to make it more suitable for 3D printing. The described techniques, which may be described as a pipeline, support a variety of exporting options (including different coordinate mappings), to generate a 3D model that is 3D print-ready from 3D video data, such as the selection of one or more frames of 3D video data.

In one example, 3D video may be extracted as an object or OBJ file, for example, including texture information. The extracted 3D video data may initially be unsuitable for printing, such as in an incorrect orientation, not in correct special relationship to a virtual 3D print bed, not defining an enclosed object or volume, etc. According to the described techniques, the extracted 3D video data may be automatically transformed into a printable object, for example via a 1-click or one-action print selection option. The transformation may include modifying the 3D data to produce an enclosed volume, correcting orientation, generating a base so that the 3D object may stand upright, applying one or more visual filters, or other modifications that may provide a more aesthetic 3D object for printing or generation. In some aspects, the transformations may additionally or alternatively include using lighting information to automatically remove or even add lighting from or to the video data, automatically positioning the model, adjusting scale and mesh resolution to match the capabilities of the printer, processing the mesh so that the objects pulled from the video maintain similar center of gravity and balance, etc.

It some examples, via the described techniques, it may be possible to easily print still frames from 3D videos, such as high-capacity camera array generated 3D video data, (i.e., pause a 3D video in a frame you like and click "print"). Many, if not all, applications that are able to play 3D video can provide a mechanism to pause on a frame. In some aspects, each frame may contain full 3D content needed for printing. In other aspects, multiple frames may be combined to more fully define the 3D content selected for printing. This may include choosing frames around a selected frame for combining with the selected frame to define one or more 3D objects in the selected frame for printing. Upon selecting a frame, such as via a pause item in a user interface associate with rendering the 3D video data, and selecting a 3D print option, the 3D video data may be transformed for immediate 3D printing. In one aspect, a process or automated pipeline may take a 3D video frame and transform the 3D video data into a high quality 3D printable object. The process for automation may require a pipeline of various filters. The filters may be reordered depending on the source of data or input parameters, for example received by a user interface, in response to one or more user selections. Some filters may be optional.

In some aspects, the extracted 3D video data may be imported into a 3D builder application, which may include a user interface, for example, providing different selections for modifying the 3D video data, such as to apply one or more filters, alter lighting of the 3D video data, and so on. In some aspects, one or more features of the user interface may be integrated or integratable with a 3D video player.

FIG. 1 illustrates an example system and process 100 for 3D generating one or more 3D objects based on a selection of 3D video data. In one aspect, system 100 may include a 3D printing device 135. In other aspects, system 100 may not require a 3D printing device 135, but may use data indicating capabilities of a target 3D printing device 135 to be used for generating a 3D model or object based on 3D video data.

A 3D video player 110 may display 3D video data 115, for example on client device 105. Client device 105 may include a computing device, such as a PC, a tablet, a smart phone or mobile device, and various other types of device. The client device 105 may include a screen on which 3D video data 115 may be displayed. The player application 110 may provide basic tools for controlling playback of 3D video data 115, such as play, fast forward, rewind, pause, etc. In some aspects, the player 110 may also include a frame capture control. In some aspects, the frame capture control may be integrated into or include a pause control option.

In one aspect, the player 110/client device 105 may receive a selection of a frame or other 3D video data portion at operation 120. According to the techniques described herein, the selected 3D video data may be transformed into one or more 3D printable or print-ready objects at operation 125. In some aspects, operation 125 may include or be based on one or more capabilities of an intended or target 3D printing device 135. In some aspects, the 3D printer capabilities may include a total volume and/or dimensions that the 3D printing device 135 is capable of producing, printer resolution such as minimum layer height or minimum increments of adjustments in the layer height, x and y axis dimensional accuracy or minimum wall thickness, types of material supported by the 3D printing device 135, and so on.

In some aspects, at operation 130, one or more filters may be applied to the transformed 3D video data for enhancing or optimizing 3D generation of the selected 3D video data. The one or more filters may include stylistic filters, such as texture, shape, and/or lighting or color filters. As used herein, dotted lines of operation block 130 in FIG. 1, and as used in the rest of this description, indicate that the so-labeled operation is optional and can be omitted from the described processes.

Next, the modified 3D video data defining a 3D model may be exported/sent to a 3D printing device 135. In some aspects, a controller 140 and/or slicer 145 of the 3D printer may modify the 3D video data for 3D printing. The 3D printing 135 device may generate, at operation 170, one or more 3D objects based on the selected 3D video data. In this way, either via a simply selection and/or through application of one or more filters, a 3D model may be easily and automatically generated from selection of 3D video data.

Figure 2:
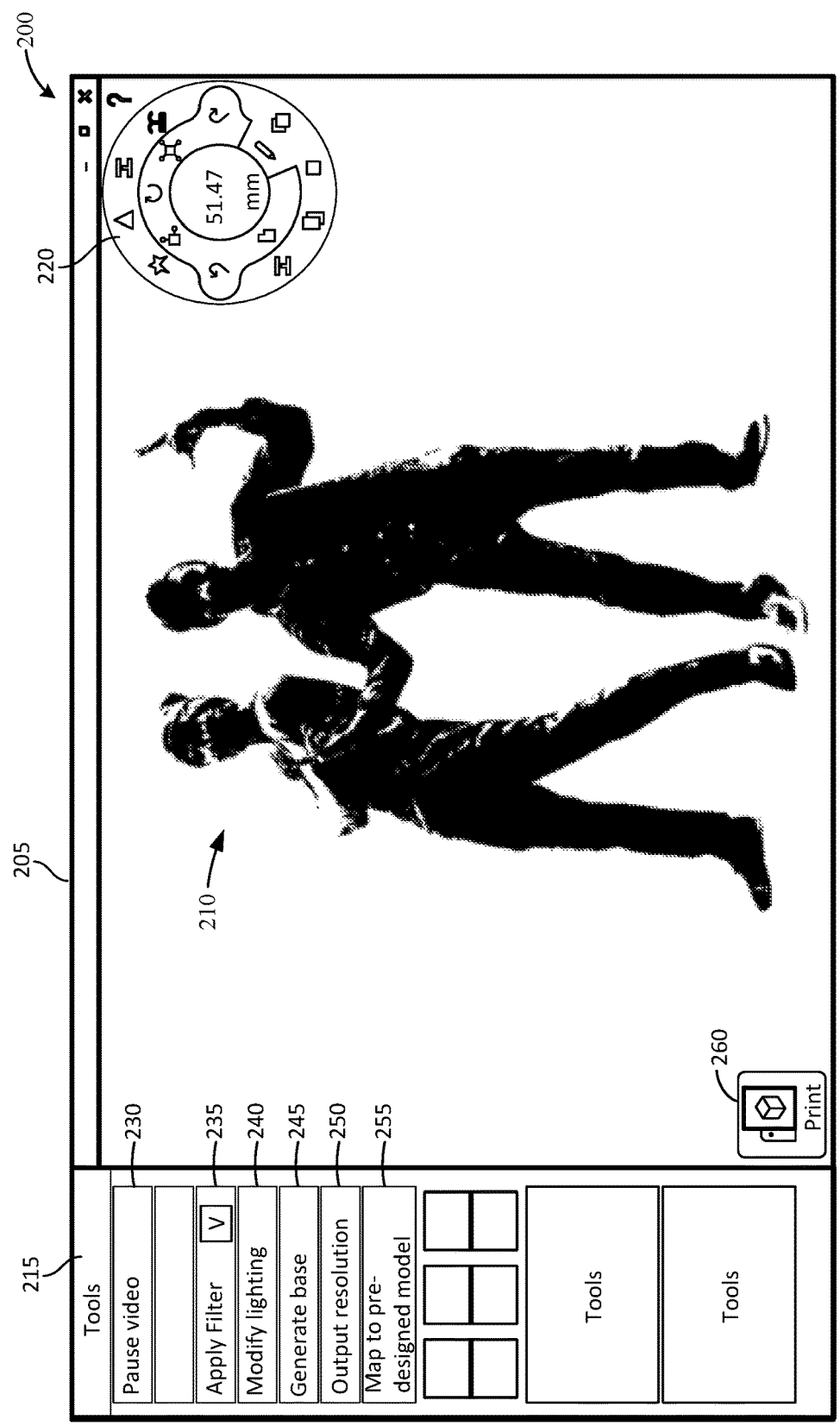
FIG. 2 depicts an example graphical user interface for displaying, selecting, and modifying 3D video data for 3D generation.

FIG. 2 illustrates an example graphical user interface (UI) 200 that enables playing, selecting, and modifying 3D video data for 3D generation, for example, by a 3D printing device. It should be appreciated that user interface 200 is only given by way of example, and that different configurations of similar controls, interfaces, etc., are contemplated herein.

UI 200 may provide for various controls and tools 215 for displaying, selecting, modifying, and exporting 3D video data 210 for 3D generation, such as via a 3D printing device 135. In one example, a pause video control 230, upon selection, may pause a 3D video currently playing in area 205 of the UI 200, for example, including 3D video data 210. 3D print option 260, upon selection, may transform the 3D video data 210 into a 3D printable model, according to the processes described below in reference to FIGS. 3, 4, 5, 6, 7, and/or 8. In some aspects, either upon selection of the 3D print option 260, or (as illustrated) in the tools area 215 of UI 200, multiple 3D video data configuration tools may be displayed. The additional tools may include an apply filter selection 235, a modify lighting selection 240, a generate base selection 245, an output resolution selection 250, a map to pre-designed model selection 255, and other selections not illustrated. In some aspects, UI 200 may also provide a 3D video data selection tool (not illustrated), that enables a user to outline or place a box, circle, or other shape around portions of 3D video data 210 desired for specific treatment for 3D printing. The specific treatment may include inclusion for 3D printing (with non-outlined items being excluded from printing), retention of special orientation of the selected object during 3D printing, and so on.

The apply filter selection 235 may enable, for example via a drop down menu, various filters for modifying the 3D image data 210 in a certain way, such as to change the color/texture of the surface or as a transformation to the 3D mesh itself. In one example, a filter may deform a mesh like circus mirrors. In other examples, one filter may enhance color of the 3D video data 210 to produce a cartoon effect; another may apply dark affect with shadows, etc. The filter selection tool may enable Instagram-like options for a user to select the style of output without requiring advanced art/animation experience.

The modify lighting option 240 may remove or add lighting to the 3D video data 210, such as by changing the location of one or more sources of light as portrayed on the 3D video data via changes in color or texture, enhancing, changing, or removing shadows, etc.

The generate base selection item 234 may automatically generate a base for the 3D video data so that, upon generation, the 3D model may stand or rest similar to the orientation of the corresponding objects in the 3D video data. An example process for generating a 3D model base will be described in greater detail below in reference to FIG. 6.

In some cases, an option for selecting an output resolution 250 may change the resolution at which the 3D printing device generates the 3D model, such as by performing geometric simplification on the mesh data that comprises the 3D video data 210. In some examples the UI 200 may also include a map to pre-designed model selection item 255, which upon selection may access a directory or database of saved and/or tagged models previously generated, for use in generating and/or modifying a model of 3D video data 210. An example process for generating a 3D model based on a pre-designed or stored 3D model will be described in greater detail below in reference to FIG. 7.

In some aspects, the UI 200 may also include various tools 200 for panning, zooming, rotating, and performing other operations on the 3D video data 210. Some or all of the features described in reference to UI 200 may be included in a separate 3D builder application, or may be integrated into a 3D video player.

Figure 3:
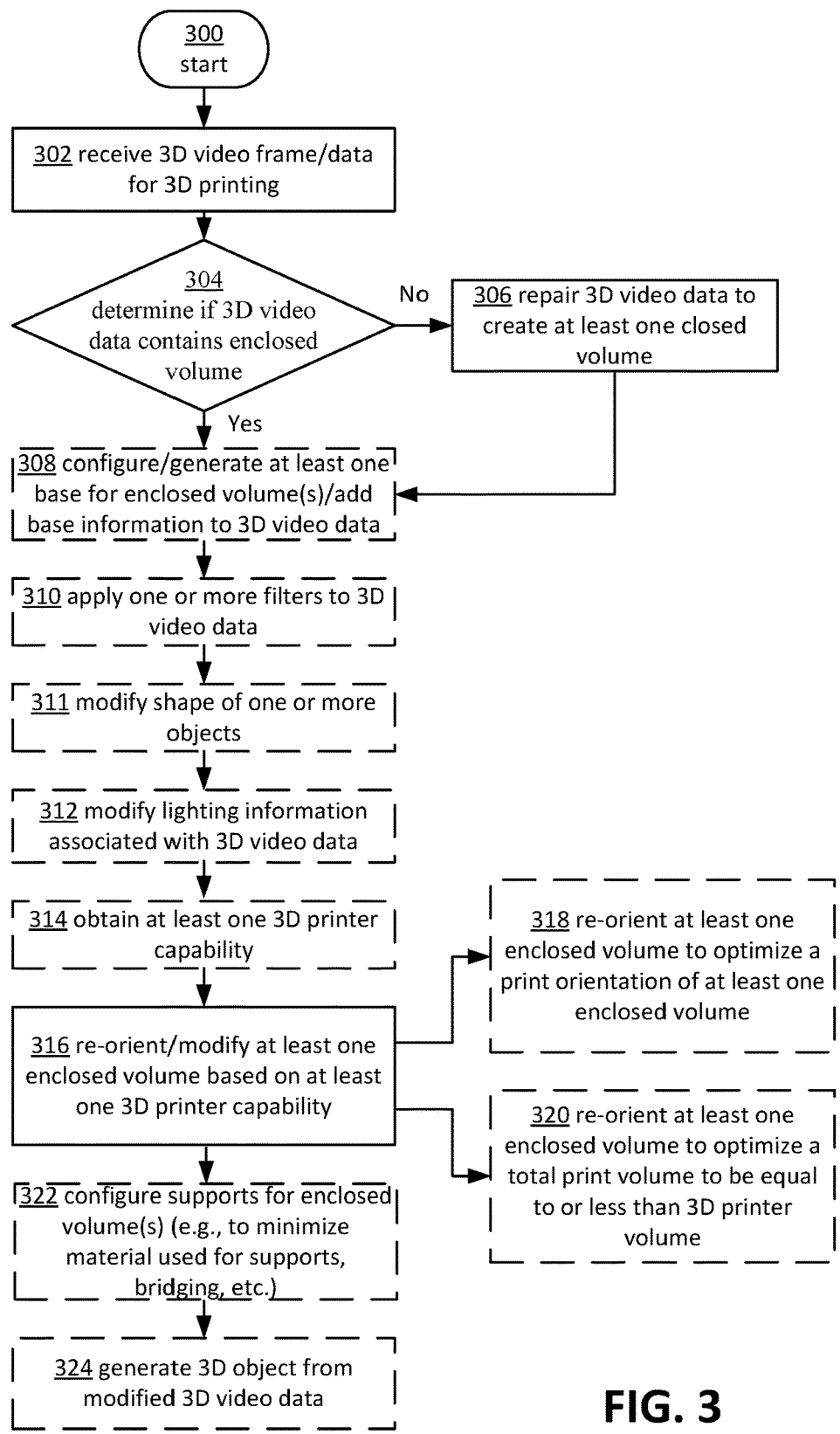
FIG. 3 depicts an example process for transforming a selection of 3D video data into a 3D-printable model.

FIG. 3 illustrates an example process 300 for transforming selected 3D video data into a 3D print-ready model, and in some aspects, exporting the 3D model to a 3D printing device for generation. Process 300 may be executed by a client device, for example, such as client device 105, and in some aspects, in all or in part by a 3D printing device, such as 3D printing device 135. Process 300 may be implemented by a standalone 3D builder application, or may be wholly or in part implemented in 3D video players modified according to the described techniques.

Process 300 may begin at operation 302, where a portion of 3D video data, such as a frame, may be received for 3D printing. In some aspects, operation 302 may include receiving a selection of a portion of 3D video data via a UI, such as UI 200. Next, it may be determined if the received 3D video data contains one or more enclosed volumes at operation 304. In one example, operation 304 may include examining the mesh data/the 3D video data for "manifoldness," for example by one or more APIs. If the 3D mesh does not define a manifold surface or object, the 3D mesh will not mathematically conform to a 3D printable model. If it is determined at operation 304, that the 3D video contains one or more un-enclosed volumes/is not manifold, process 300 may proceed to operation 306, where the 3D video data may be repaired or modified to create one or more enclosed volumes. In some aspects, operation 306 may include enclosing all of the volumes or different objects identified in the 3D video data, for example, to ensure 3D printing of a complete scene. Operation 306 may include one or more of closing holes, reorienting triangles, or ensuring that there is a clear interior and exterior to the mesh that represents a physical volume that can be printed. The 3D video data does not need to be strictly analyzed to apply repairs to it. For example, the repairing algorithm can be applied to all of the 3D video data. If the output data is the same as the input, then no repairs were needed. For example, if a filter is used to remove double triangles on a mesh that does not have double triangles, then the algorithm will not modify the mesh.

In other aspects, one or more volumes or objects may be selected through UI 200, for example, to limit the number of objects to be printed from a frame of 3D video data. For example, as illustrated in FIG. 2, video data 210 only contains two people. Via the described techniques, a user may select only one of the people or portion hereof for 3D printing. In other example, when there are many more objects in 3D video data, one or more objects may be removed from the 3D printing transformation process, either by manual user selection or via a reduction algorithm, for example, that may be configurable by the user. The reduction algorithm may, for example, locate objects in the foreground of the 3D video data, include those objects to be modeled, and successively include more objects that are farther into the background of the video data based on an object or resolution threshold or limit. The reduction algorithm may be used to clip the video data using X, Y, Z thresholds to focus on one or more important areas of the video data. In some aspects, another way is to implement a reduction algorithm is using segmentation to identify connected objects. If a separate segment can be identified in the video data, that may imply that other objects around it are distinct, which may enable identification and subsequent trimming or removing of one or more segments, as desired.

In some aspects, it is possible that 3D video data included in the video frame already fully defines and encloses one or more volume. In this scenario, operation 306 may be omitted from process 300, for example, to improve efficiency of the 3D transformation process. In some aspects, the modified or unmodified 3D video data defining a volume may be preserved through other operations to reduce duplicative efforts and unneeded processing. More detailed examples of operation 306 will be described below in reference to FIGS. 4 and 5.

In some aspects, process 300 may include operation 308, in which one or more bases or base structures may be generated for one or more enclosed volumes of the 3D video data. In some aspects, operation 308 may additionally or alternatively include adding base or floor information to the 3D video data, for example, to identify a floor or ground plane in the 3D model. The 3D video data can be augmented with information indicating the floor plane to enable transforming the object in an automated way so it prints on the 3D printer in the same way as seen in video. A more detailed example of operation 308 will be described below in reference to FIG. 6.

In some aspects, process 300 may also include operation 310, in which one or more filters may be applied to the 3D video data, for example, to enhance the aesthetic quality of a physical 3D object or objects generated from the modified 3D video data. Various filters can be automatically or manually applied to the model to affect the overall style. Each filter can be applied just to the color/texture of the surface of the 3D video data or as a transformation to the 3D mesh of the 3D video data itself. In one example, a filter may deform a mesh like circus mirrors. In other examples, one filter may enhance color of the 3D video data 210 to produce a cartoon effect, another may apply dark affect with shadows, etc. A certain filter may be selected, for example, via item 235 of user interface 200 as described above. The filter selection tool 235 may enable Instagram-like options for a user to select the style of output without requiring advanced art/animation experience. The filters may each be different. In general, each of the filters may modify one mesh and/or one texture atlas. For example, a stretching filter may modify the mesh so that one of the axes is scaled (to make the character look taller, for example). A tone mapping filter may operate on the texture atlas to increase/decrease the color saturation, and so on.

In some aspects, process 300 may include operation 311, in which the shape of one or more objects in the 3D video data may be modified to look more realistic in the 3D model/print. For example, a "hair stylization" algorithm may be applied to the objects, which may modify, for example, a volume associated with hair of a person to add more texture, color and volumetric variation to more realistically simulate hair. This may be accomplished, for instance, by modelling hair as a manifold volume and adding deformations or other features to the manifold volume. The changes to the manifold volume may also be accompanied by corresponding changes in color and/or texture to the volume representative of the hair of the person. In another example, the capabilities of the 3D printer may be obtained and the material properties of the material to be used to generate the 3D object, such as, diffusion, specularity, and/or color, may be determined. Using this information, the surface of the mesh may be generated on a screen of a client device as it will appear when generated by the 3D printer. In this way, photorealistic previewing of the 3D object(s) may be provided before printing based on the actual target device.

In some aspects, process 300 may include operation 312, in which lighting information associated with the 3D video data may be modified, for example, to enhance the printed one or more objects. Lighting information may be changed, deleted, or added, for example, to the 3D video data. Modifying the lighting information may remove or add lighting to the 3D video data 210, such as by changing the location of one or more sources of light as portrayed on the 3D video data via changes in color or texture, enhancing, changing, or removing shadows, etc. Changing existing lighting assumes that lighting information is contained in the video stream. However, if lighting information is not contained in the video stream or 3D data, changing lighting information may be limited to applying new light sources, which may ultimately lighten or darken the model and modelling shading. This may be performed similar to rendering on screen, but the color values adjusted for lighting may be passed to the target printing device. Adjusting the color values may include uniformly rebalancing colors to be brighter or darker.

Next, at operation 314, destination or target 3D printing device information may be obtained, such as capability information. The target 3D printing device capabilities may include total volume and or dimensions that the 3D printing device 135 is capable of producing, printer resolution such as minimum layer height or minimum increments of adjustments in the layer height, x and y axis dimensional accuracy, types of material the 3D printer is capable of using, and so on. In some cases, operation 314 may include querying a 3D printing device in communication with a client device on which the 3D video is rendered. In other cases, operation 314 may include locating printer specifications based on model number of the 3D printer, for example, via online resources and the like. Operation 314 may be performed upon, for example, selection of a portion or frame of 3D video data for 3D printing.

Next, at operation 316, at least one enclosed volume within the 3D video data may be re-oriented or modified based on the target 3D printer device capabilities. The 3D model exported from the above process or pipeline may be 3D printed using the pipeline described above. On some printers, for example, the orientation of the model may require extensive support structure to print correctly. Or many objects in a scene may be spaced out such that they do not fit a print bed without "packing" onto a print bed. Via operation 316, based on the capabilities published for a destination printer, the 3D model may be oriented in an optimized way.

In some aspects, operation 316 may also include operation 318, in which at least one enclosed volume of the 3D video data may be re-oriented to optimize a print orientation of at least one enclosed volume. In some aspects, it may be desirable to minimize overhang or bridging in the 3D model to enable a cleaner, better, or more efficient (e.g., less materials, less time, etc.) 3D generation of the 3D model. This may be accomplished by re-orienting at least one enclosed volume in the 3D model, for example, based on the volume/dimensions of each object or enclosed volume of the 3D video data, in light of volume/dimension capabilities of a target 3D printer.

In some aspects, operation 316 may additionally or alternatively include re-orienting at least one enclosed volume to optimize a total print volume to be equal to or less than a 3D printer volume, at operation 320. In some aspects, operation 320 may include rotating or translating, offsetting, etc., one or more objects in the 3D model to fit within a total 3D print volume of a target 3D printing device. Operation 320 may include determining dimensions of space within the 3D video data not occupied by an object, determining the dimensions of one or more objects, and re-orienting one or more objects to fill the space not occupied by an object, within the confines of the total print dimensions. An optimal algorithm for "packing" or reducing the total volume of a 3D model for 3D printing in three dimensions may include efficiently orienting parts on a fixed Z plane (the build plate), so the parts or different objects do not overlap.

In some aspects, any of operations 316, 318, and/or 320 may be modified or informed by one or more user selections indicating a preference to retain relative orientations of some or all of the objects, a 3D printer resolution (e.g., which may affect an amount of overhang or bridging capable of accurate generation given a specific printer resolution/layer height, etc.). In some cases, preserving original orientation may reduce the support material required to generate the model, and/or may improve surface finish of certain parts of a model. In some aspects, retaining original orientation, or reorienting parts of a complete 3D model may be dictated by individual printer capabilities and/or weaknesses.

In some aspects, process 300 may include configuring supports for one or more enclosed volumes in the 3D model at operation 322. Some objects may be in the air and not supported by model material (e.g., underneath) and will be difficult to print. In these cases, multiple materials may be indicated in the model, for example, associated with different 3D meshes or portions of meshes of the 3D model. In some aspects, a transparent physical material can be applied to one or more support structures/meshes to hold objects seemingly suspended in the air.

In some aspects, operation 322 may include configuring one or more supports for an object to minimize the material used in generating the support (e.g., hollowing out the support as it may be removed after 3D generation, etc.). In some aspects, bridging portions of the 3D model may similarly be configured to minimize the material used for generating these portions.

In some aspects, upon completion of operation 316 and/or 322, the 3D model may be exported for 3D generation. In some aspects, process 300 may also include sending the 3D model to a 3D printing device, which may then generate the 3D model, at operation 324.

In some aspects, scale information may be embedded in the 3D video data indicating the actual size of the model as it relates the physical world. The 3D print pipeline/process 300 may retain this data through the pipeline to ensure operations performed on the model retain the original scale.

This may enable 3D printing life-sized or accurate scale objects without additional customer input where technology allows.

Figure 4:
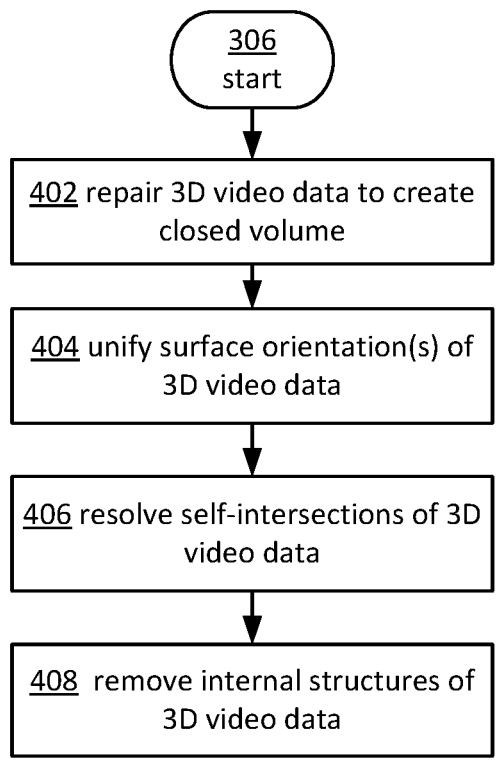
FIGS. 4 and 5 depict example process for repairing 3D video data to define one or more enclosed volumes for 3D generation.
Figure 5:
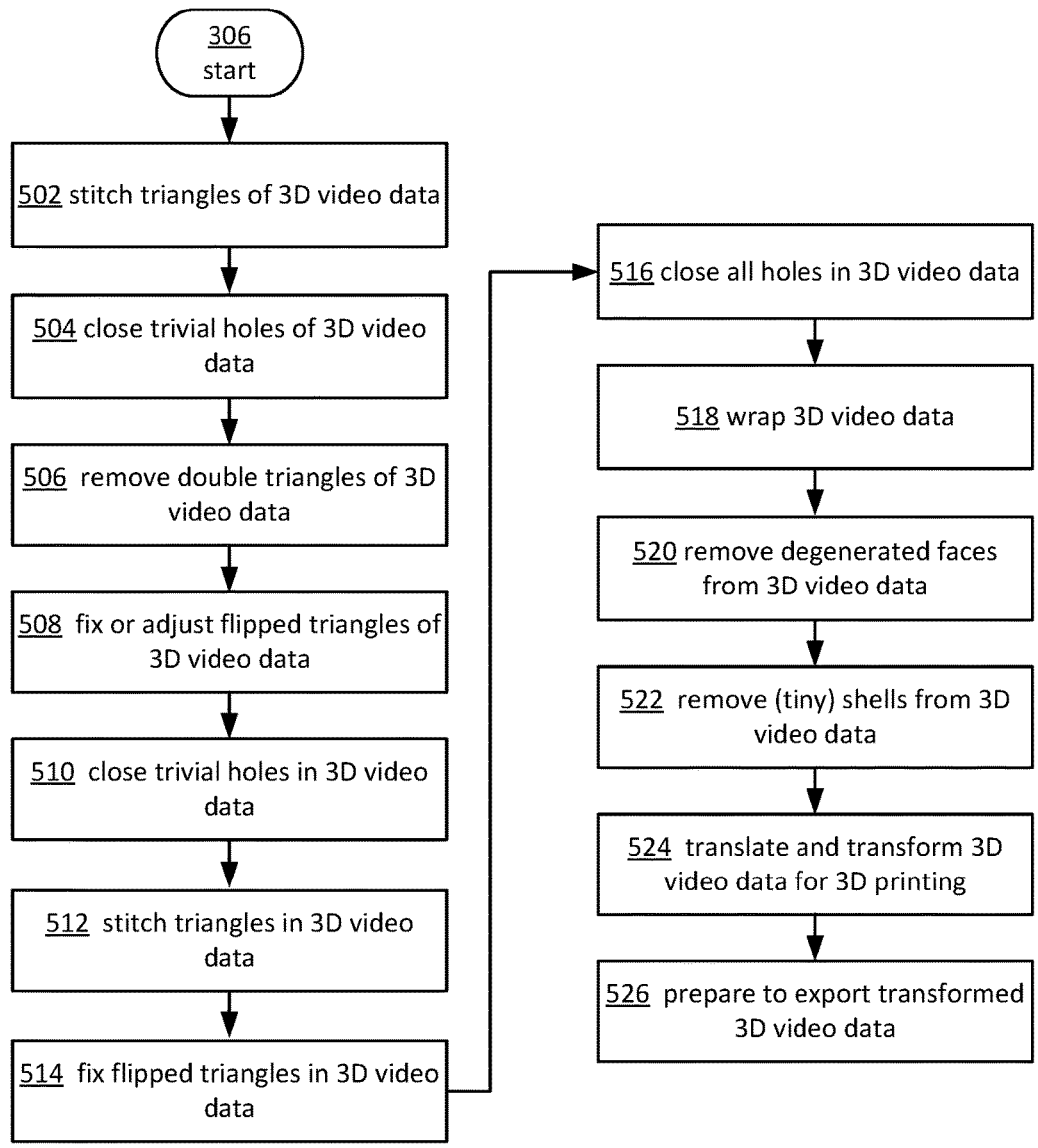

FIGS. 4 and 5 illustrate more detailed processes 400 and 500 for repairing 3D video data, for example, as an example of operation 306 of process 300, which may include a frame captured from 3D video playing on a device, to yield a 3D model that is readily printable by a 3D printer. Processes 400 and 500 may apply different filters to 3D video data, which may include a structure or mesh of vertices connected by lines defining different surfaces of the 3D video data, to make it water tight (e.g., enclosing a volume) and 3D printable. Processes 400 and/or 500 may be used to create a closed volume, create unified surfaces orientation, resolve self-intersections and remove internal structures, and resolve transform and translation, to yield a 3D model that is capable of being printed.

With reference to FIG. 4, upon receiving a selection of 3D video data for 3D printing, holes in the 3D mesh may be identified. The holes or gaps may be filled in or repaired, to create an enclosed volume or volumes, at operation 402. This may include adding segments and/or vertices to the mesh based on best fit, extrapolation, and other known mathematical techniques, to match or align with proximate segments and/or vertices to the gap or hole.

Next, at operation 404, the surface orientations of the 3D mesh may be unified, for example, to smooth out the 3D mesh to produce a more aesthetic physical 3D model. In some aspects, the initial reconstruction of the 3D mesh may produce jaggedness or noise that is not identical to the object or frame captured from the 3D video. In some aspects, an optional filter may be applied to smooth out the 3D mesh, implementing various techniques. The initial reconstruction may implement a Poisson surface reconstruction to smooth sharp edges. A ray casting technique may be used to find the surface and then provide a 3D mesh that uniformly wraps the exterior surface (e.g., shrink wrapping). In one example, a Laplace-Beltrami operator can be applied on the mesh in order to effectively reduce high-frequency data from the mesh. However, in some aspects, Poisson reconstruction may smooth out fine details, and as such, may not be applicable for all 3D printing scenarios. Various other smoothing techniques may be used, for example, such as are known in the art.

At operation 406, self-intersections of the 3D video data/mesh may be resolved, for example, to reduce unneeded complexity of the 3D mesh, to create smooth lines in the 3D model, etc. Mesh simplification, such as decimation, can be used to reduce the complexity of the 3D mesh. In some aspects, a 3D printer at a given scale may have a lower resolution when compared to 3D video data. In one example, resolution or complexity of the 3D model may be reduced to the smallest features that would show up or be generated by a 3D printer, for example according to the techniques described in U.S. patent application Ser. No. 15/178,364, titled "Adaptive Decimation Using 3D Video Features," filed Jun. 9, 2016, the entire contents of which are incorporated by reference.

At operation 408, internal structures of the 3D video data/mesh may be removed. This may include identifying outer surfaces of the 3D mesh and then removing structures that are within the enclosed volume of the object. One way to remove inner structures of a mesh is to rasterize the mesh from a number of viewpoints (for example, consider a sphere enclosing the 3D model in which cameras are evenly spread on its surface, all looking in). Identification of the triangles that are visible to cameras may be annotated with a Z-buffering algorithm. Any triangles that are not visible by any viewpoint can be considered inner structures and thus removed. In some aspects, it may be important to maintain interior structures. For example, a hollow interior in a toy may rattle with a separate bead printed as a full object on the insider of the rattle. This and other examples of interior objects may be determined by surface normal orientation, with extraneous, confusing, or disconnected geometry contained between valid exterior surfaces of an object being safely removed.

Process 400 may yield a 3D model that is fully defined in such a way that it is readily-printable by a 3D printing device.

FIG. 5 illustrates one specific implementation of a process 500 for repairing 3D video data, and may be performed as part of operation 306 of process 300. Process 500 may begin at operation 502, where triangles of the 3D video mesh may be stitched. The stitching operation refers to the conversion between the mesh as a group of individual triangles ("triangle soup"), in which every triangle is independent, into a mesh in which triangles share vertices. This can be done in a number of ways, for example by obtaining every vertex in every triangle, finding the nearest neighbor vertices, and merging vertices that occupy the same coordinates in space. Next, at operation 504, trivial holes of the 3D video data may be closed. Double triangles of the 3D video data may be removed, at operation 506, and any flipped triangles of the 3D video data may be fixed or adjusted, at operation 508. Next, trivial holes may again be identified and closed at operation 510, the triangles of the 3D video data may be stitched, at operation 512, and any triangles that have been flipped may be fixed, adjusted or re-oriented at operation 514. Next, at operation 516, all holes in the 3D data may be closed. The 3D video data may then be wrapped at operation 518, such that all surface normal are properly oriented. Any degenerated faces of the 3D video data may then be removed, at operation 520, along with any shells or artifacts (e.g., of a certain magnitude, such as below a threshold size), at operation 522. Next, at operation 524, the 3D video data may be translated and transformed into a 3D printing device coordinate system, for 3D printing, for example. In some aspects, operation 524 may include one or more of operations 316, 318, and/or 320, such as in a different order than illustrated in process 300, or for example, in a similar order, by excluding operation 308, 310, 311, 312,314, and/or 322. Next, at operation 526, the modified/repaired 3D model may be exported for 3D generation.

Figure 6:
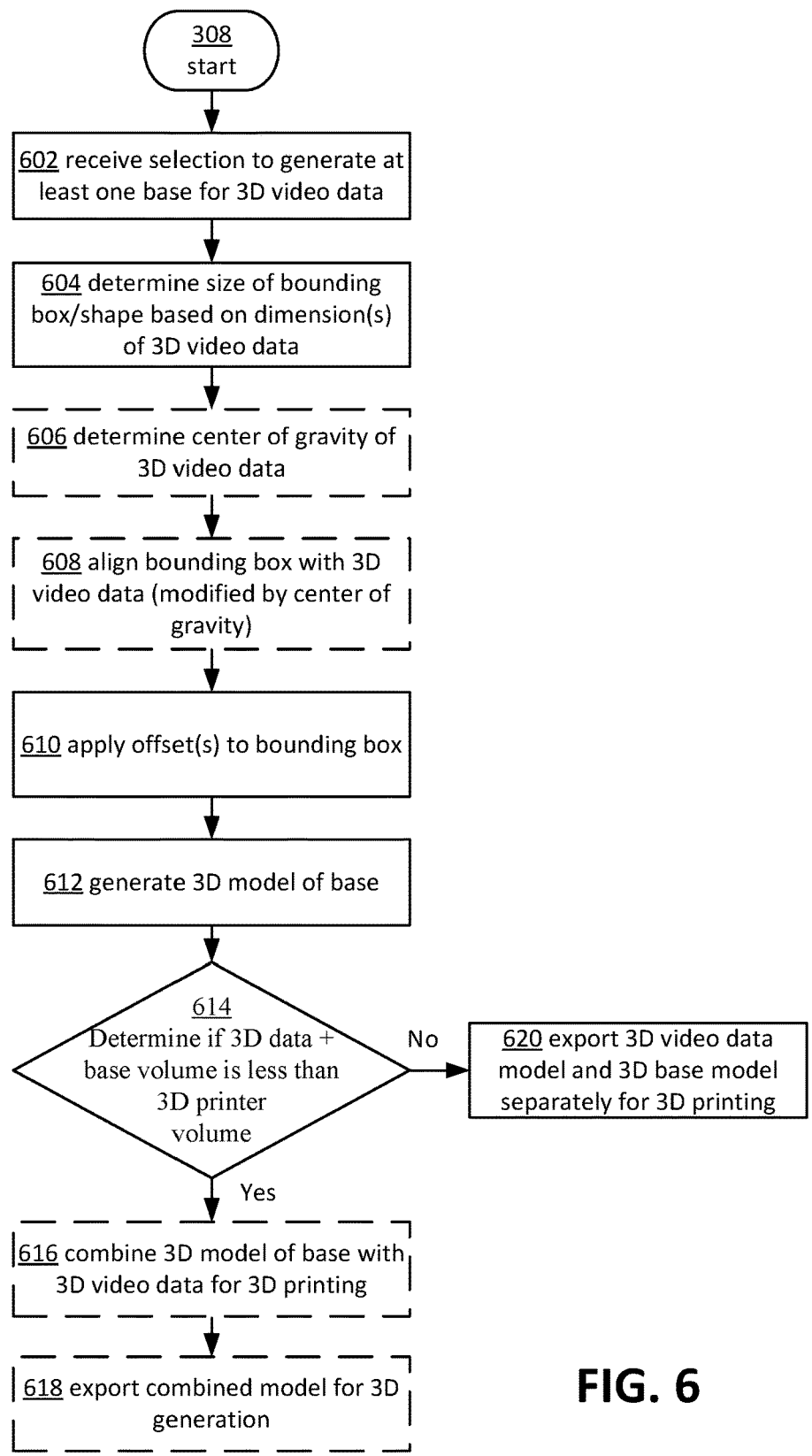
FIG. 6 depicts an example process for generating a base structure for a 3D model.

FIG. 6 illustrates an example of a more detailed process for generating one or more base structures of a 3D model, such as an example of operation 308 of process 300 described above. In some aspects, process 308 may generate a minimized-size/volume base based on center of gravity of the 3D model and radius based on a bounding box derived from the 3D video data. In some cases, a solid base may be important for making sure some models are able to stand correctly. An aesthetically pleasing base may enhance the quality and desirability of a 3D printed object or objects. From a high level, using a bounding box and simple offsets, in some aspects, influenced by the center or center of gravity of the object or objects in the 3D video data, the generation of a base to support the rest of the 3D print can be automated. In some aspects, the center of gravity of the model may be applied to make the base heavier, for example to more securely support the 3D model for standing in a certain orientation once generated. 3D video may contain people and objects that need to stand upright after printing. Using center of gravity detection, along with tools for producing a suitable base, it is possible to generate 3D prints that will stand in the correct orientation.

Process 308 may begin at operation 602, where a selection to generate one or more base structures for 3D video data may be received, for example, through UI 200 described above in reference to FIG. 2. In some examples, a base may be automatically generated for 3D video data without receiving an explicit selection or instruction to do so. Next, at operation 604, a size of a bounding box or other shape may be determined based on dimensions of the 3D video data. In some aspects, the bounding box may be selected to conform to (e.g., be equal to or less than) a print volume/dimensions of a target 3D printer. In some cases, the total size of the 3D model generated from the 3D video data may be reduced in order to be printable by the target 3D printer before operation 604 is performed.

Next, at operation 610, one or more offsets may be applied to the bounding box, for example, to ensure the base structure or structures align with the objects in the 3D model (for example, based on the center of all of the 3D objects). Next, at operation 612, a 3D model of the base structure may be generated, based on the bounding box or shape, and any offsets applied to the bounding box. In some cases, a thickness and/or the shape (circular, oval, rounded edges, rectangular, etc.) of the base may be determined or pre-selected based on a total height, width, other dimensional characteristic, or other characteristic of the 3D model.

In some aspects, one or more centers of gravity (e.g., for each object in the 3D model), may be determined at operation 606. The bounding box or shape may be aligned with the center of gravity of the 3D model or modified, at operation 608, for example, to ensure that the base will support the 3D model once generated. In some aspects, this may include increasing the size of the base if the center of gravity is determined to be a certain threshold distance above the base structure/bottom of the 3D model, decreasing the size of the base if the center of gravity is lower, adjusting the center of the base based on multiple centers of gravity for multiple objects, for example, having different weights assigned to them based on the amount of material to be used to generate each respective object, and so on.

Next, at operation 614, it may be determined if a volume of the 3D base plus the 3D volume is less than the total 3D printer volume. If the total volume of the base and 3D model is less than the total print volume, the base model may be combined with the 3D model, at operation 616. In some aspects, this may include adding support structures/connection points between the base and the 3D model, for instance, where only a few smaller portions of the 3D model will contact the base. In other cases, the 3D model may have a substantial structure at the base of the 3D model, and so may be located directly in contact with the base structure with minimal or or modification. In these scenarios, the combined model may then be exported to a 3D printing device for generation.

In cases where, at operation 614, it is determined that the volume or dimensions of the 3D model and the base structure exceed the total print volume/dimensions, the base may be generated as a separate model, at operation 620, and exported with the 3D model to be printed separately and then connected to the 3D model. In some cases, pegs and corresponding holes (or other type of support structures or connectors) may be automatically generated in the base and correspond connections points with the 3D model to ensure that the base and 3D model can be removably or permanently joined post 3D generation.

Figure 7:
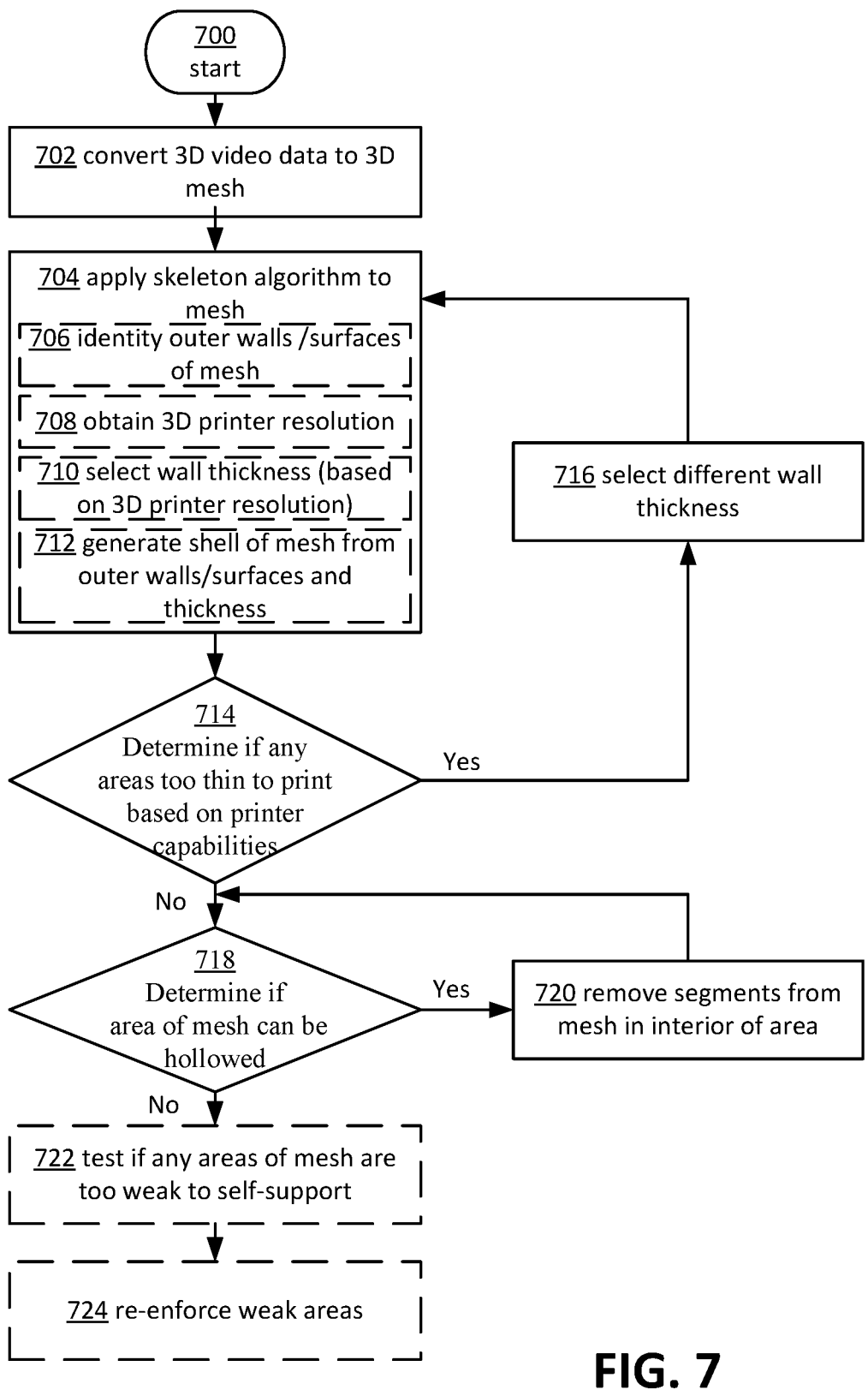
FIG. 7 depicts an example process for converting 3D video data into a skeleton or shell structure for 3D generation.

FIG. 7 illustrates an example process 700 for reducing or adding material in a 3D model and/or base generated from 3D video data, for example, to yield a more efficient 3D model for printing while maintaining or enhancing structural integrity of the 3D model. In some aspects, process 700 may be implemented separate from, or in combination with process 300 and/or processes 400, 500, and/or 600 described above. Process 700 may produce a skeleton or shell from the 3D video data mesh that can be used to hollow the 3D model or reduce the thickness of walls of the 3D model to reduce the amount of material needed to 3D generate the model, perform structural analysis on the model to ensure that it will support itself/be durable for an intended use, and so on.

From a high level, process 700 may generate a mathematical structure with outer walls and central structure. The structure may be used, in one aspect, to identify areas that will be too thin to print based on the capabilities of the 3D printer. Process 700 may also identify areas that can be made hollow to reduce print time and reduce the material required to produce the 3D model. Model analysis using a basic skeleton or shell structure can help identify if the mesh is structurally sound—the parts are connected in a way that the model can support itself, for example.

Process 700 may begin at operation 702, where 3D video data may be converted to a 3D mesh structure. In some aspects, this may be performed automatically. In yet some aspects, the 3D video may include mesh information. In any case, a skeleton or shell algorithm may then be applied to the mesh data at operation 704. In some aspects, the shell algorithm may include one or more of identifying outer walls or surfaces of the mesh, at operation 706. The target 3D printing device resolution and/or other capabilities (e.g., minimum layer thickness), may be obtained at operation 708. A wall thickness may then be selected based on the target 3D printer capabilities, at operation 710. A shell of the mesh data may then be generated by applying the wall thickness to the outer walls/surface of the mesh, at operation 712.

Next, at operation 714, it may be determined if any areas/walls of the shell structure are too thin to print based on the obtained 3D printer capabilities. If the determination is positive, a different wall thickness may be selected at operation 716 and one or more of operations 704-712 repeated until a satisfactory wall thickness is selected. Once the wall thickness is determined to be printable by the target 3D printing device, process 700 may proceed to operation 718, where it may be determined if any areas of the modified 3D video data/mesh shell structure, can be further hollowed. Operation 718 may be performed based on a threshold minimum thickness for walls of the 3D mesh, based on loads on the 3D mesh, etc. If yes, one or more segments may be removed from the mesh at operation 720.

Once no more segments can be removed, process 700 may proceed to operation 722, where the mesh structure may be tested to find any weak areas of the mesh that may not self-support the 3D model. Operation 722 may include assigning a density to the material to be used to generate the 3D model (e.g., a configurable or default material), obtaining strength information for the print material (e.g., via online resources, manufacturer specifications, etc.), and calculating load on various portions of the shell structure of the 3D model. If the load exceeds the strength of a given portion, the wall corresponding to the portion may be determined to be too thin to support the 3D model. In some aspects, the threshold for determining if the load is too great for a portion of the 3D model may be configurable, such as based on a safety threshold, an intended use requiring greater durability in the 3D printed object, and the like. If the modified 3D model/shell structure is determined to be too weak to self-support or for an intended use, the weak areas of the 3D model may be re-enforced, at operation 724, for example, by increasing the wall thickness of an area corresponding to, proximate to, or supporting the determined weak area.

In some cases, if multiple areas of the 3D structure are determined to be too weak at operation 722, a different wall thickness may be selected, for example for the identified portion of the 3D model, or in some cases, globally. The shell structure may then be rebuilt or modified via operation 704-720 and in some cases, one or more of operations 706-712, until a suitable wall thickness is selected, and the structure meets the strength criteria at operation 722. Process 700 may then output a 3D model that has been hollowed and strengthened, if necessary, and is 3D print-ready.

Figure 8:
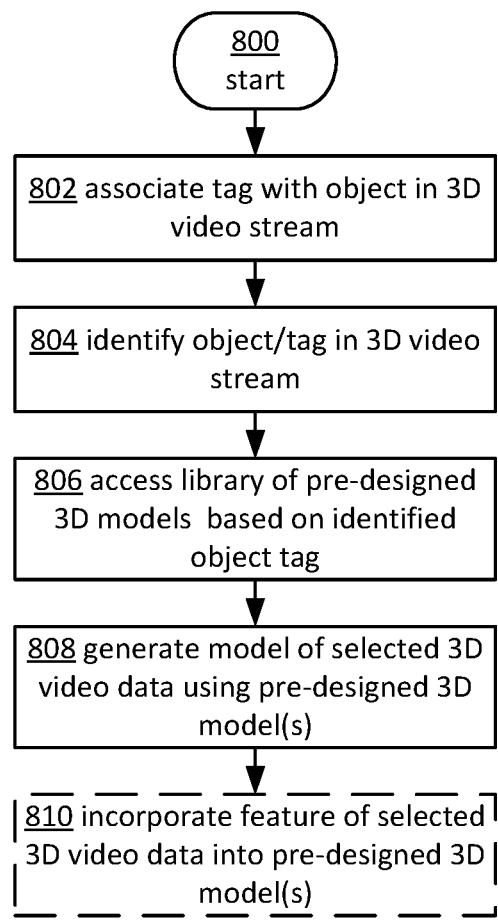
FIG. 8 depicts an example process for using a predefined 3D model for generating one or more objects from 3D video data based on information associated with the 3D video data.

FIG. 8 illustrates an example process 800 for identifying portions or objects of 3D video data that can be mapped to high quality pre-designed models or similar objects, for example, to enhance the quality of 3D models generated based on the 3D video data, and/or reduce the amount of processing required to yield a print-ready 3D model. In some aspects, process 800 may be used separate from, or in combination with, process 300 and/or processes 400, 500, 600, and/or 700 described above.

Process 800 may include tagging video data in the video stream with an identity that can be later referenced against a large library of higher or high quality pre-built 3D assets. This may enable connecting customers with a pre-built super high fidelity model for key aspects in the video. When a customer selects a 3D video frame in a 3D video player application or other application, the application may extract the 3D data identities and look them up against a database of 3D models already prepared for 3D printing. This may enable 3D video to be used as a way to preview 3D-printable content. In this scenario, a higher quality version may be cached/stored for reference or for other uses.

Process 800 may begin at operation 802, where one or more tags may be associated with one or more objects in a 3D video stream or 3D video data. Operation 802 may utilize object recognition techniques as are known in the art, manual association, and/or other techniques. Next, at operation 804, an object associated with a tag may be identified in a 3D video stream, and/or in a selected portion of the 3D video frame selected for 3D printing. Using the associated tag information, a library of pre-designed or previously-designed 3D models may be searched, at operation 806. Next, at operation 808, a model of the tagged 3D data/object may be accessed and generated from the library using the pre-designed model. In this way, for example, upon selection of a 3D video data/a frame thereof for 3D printing, a higher quality 3D model corresponding to the selected 3D video data may be more efficiently and/or more quickly generated using a pre-designed model. In some aspects, process 800 may also include operation 810, in which one or more features of the selected 3D video data may be incorporated into the pre-designed 3D model of the tagged object.

In some examples, one or more aspects of the described techniques may be applied to CNC machining, or other 3D generation devices and techniques, such as by obtaining machining specifications of a CNC machine or device and modifying a 3D model generated from 3D video data based on the same.

Figure 9:
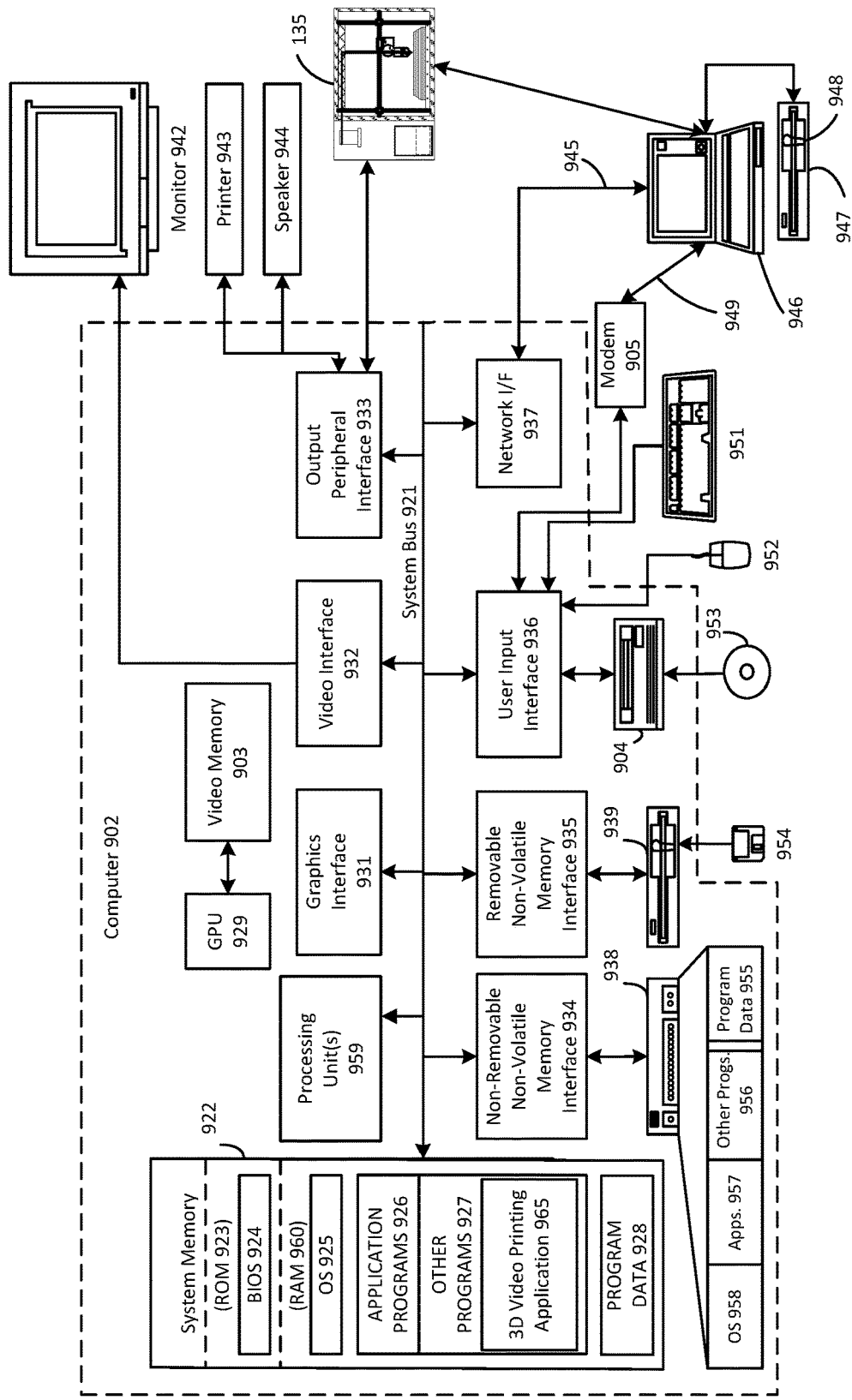
FIG. 9 depicts an example general purpose computing environment in which the techniques described herein may be embodied.

The 3D modeling or builder application/user interface 200 described above, and any of processes 300, 400, 500, 600, 700 and/or 800 for 3D generating a #D model from 3D video data may be implemented on one or more computing devices or environments, as described below. FIG. 9 depicts an example general purpose computing environment in which some of the techniques described herein may be embodied. The computing system environment 902 is only one example of a suitable computing environment and is not intended to suggest any limitation as to the scope of use or functionality of the presently disclosed subject matter. Neither should the computing environment 902 be interpreted as having any dependency or requirement relating to any one or combination of components illustrated in the example operating environment 902. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 902, which may include any of a mobile device or smart phone, tablet, laptop, desktop computer, etc., typically includes a variety of computer-readable media. Computer-readable media can be any available media that can be accessed by computer 902 and includes both volatile and nonvolatile media, removable and non-removable media. The system memory 922 includes computer-readable storage media in the form of volatile and/or nonvolatile memory such as read only memory (ROM) 923 and random access memory (RAM) 960. A basic input/output system 924 (BIOS), containing the basic routines that help to transfer information between elements within computer 902, such as during start-up, is typically stored in ROM 923. RAM 960 typically contains data and/or program modules that are immediately accessible to and/or presently being operated on by processing unit 959. By way of example, and not limitation, FIG. 9 illustrates operating system 925, application programs 926, other program modules 927, and program data 928.

The computer 902 may also include other removable/non-removable, volatile/nonvolatile computer storage media. By way of example only, FIG. 8 illustrates a hard disk drive 938 that reads from or writes to non-removable, nonvolatile magnetic media, a magnetic disk drive 939 that reads from or writes to a removable, nonvolatile magnetic disk 954, and an optical disk drive 904 that reads from or writes to a removable, nonvolatile optical disk 953 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 938 is typically connected to the system bus 921 through a non-removable memory interface such as interface 934, and magnetic disk drive 939 and optical disk drive 904 are typically connected to the system bus 921 by a removable memory interface, such as interface 935.

The drives and their associated computer storage media discussed above and illustrated in FIG. 9, provide storage of computer-readable instructions, data structures, program modules and other data for the computer 902. In FIG. 9, for example, hard disk drive 938 is illustrated as storing operating system 958, application programs 957, other program modules 956, and program data 955. Note that these components can either be the same as or different from operating system 925, application programs 926, other program modules 927, and program data 928. Operating system 958, application programs 957, other program modules 956, and program data 955 are given different numbers here to illustrate that, at a minimum, they are different copies. A user may enter commands and information into the computer 902 through input devices such as a keyboard 951 and pointing device 952, commonly referred to as a mouse, trackball or touch pad. Other input devices (not shown) may include a microphone, joystick, game pad, satellite dish, scanner, or the like. These and other input devices are often connected to the processing unit 959 through a user input interface 936 that is coupled to the system bus, but may be connected by other interface and bus structures, such as a parallel port, game port or a universal serial bus (USB). A monitor 942 or other type of display device is also connected to the system bus 921 via an interface, such as a video interface 932. In addition to the monitor, computers may also include other peripheral output devices such as speakers 944 and printer 943, such as a 3D printer, which may be connected through an output peripheral interface 933.

The computer 902 may operate in a networked environment using logical connections to one or more remote computers, such as a remote computer 946. The remote computer 946 may be a personal computer, a server, a router, a network PC, a peer device or other common network node, and typically includes many or all of the elements described above relative to the computer 902, although only a memory storage device 947 has been illustrated in FIG. 9. The logical connections depicted in FIG. 9 include a local area network (LAN) 945 and a wide area network (WAN) 949, but may also include other networks. Such networking environments are commonplace in offices, enterprise-wide computer networks, intranets and the Internet.

When used in a LAN networking environment, the computer 902 is connected to the LAN 945 through a network interface or adapter 937. When used in a WAN networking environment, the computer 902 typically includes a modem 905 or other means for establishing communications over the WAN 949, such as the Internet. The modem 905, which may be internal or external, may be connected to the system bus 921 via the user input interface 936, or other appropriate mechanism. In a networked environment, program modules depicted relative to the computer 902, or portions thereof, may be stored in the remote memory storage device. By way of example, and not limitation, FIG. 9 illustrates remote application programs 948 as residing on memory device 947. It will be appreciated that the network connections shown are example and other means of establishing a communications link between the computers may be used.

In some aspects, other programs 827 may include a 3D video printing application 965 that provides the functionality as described above. In some cases, video printing application 965 may execute processes 300, 400, 500, 600, 700, and/or 800, and provide a user interface 200, as described above, through graphics interface 931, video interface 932, output peripheral interface 933, and/or one or more monitors or touch screen devices 942. In some aspects, the 3D video printing application 965 may communicate with 3D printer 135 to produce a physical 3D model of the selected 3D video data, for example, optimized to the capabilities of the 3D printer 135. In some aspects, other programs 827 may include one or more 3D virtualization applications that may obtain and provide images that may be displayed of 3D models generated by the 3D video printing application 965.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for transforming three dimensional (3D) video data into a 3D printable model, the system comprising:
    a processor; and
    memory storing instructions, that when executed by the processor, cause the system to:
        receive a selection of 3D video data for 3D printing;
        identify at least one capability of a 3D printing device;
        modify a portion of the selected 3D video data to generate a 3D model,
    wherein the modifying defines at least one enclosed volume;
        generate at least one base for the 3D model;
        determine a bounding area based on the 3D model;
        modify the at least one base based on the determined bounding area;
        re-orient the at least one enclosed volume of the 3D model based on the least one capability of a 3D printing device; and
        transmit the 3D model to a 3D printing device for generating at least one 3D object; and
        direct the 3D printer device to print the at least one 3D object according to the 3D model.

2. The system of claim 1, wherein the instructions stored in the memory, upon execution, further cause the system to:
    instantiate a user interface configured to render the 3D video data; and
    receive the selection of the 3D video data through the user interface.

3. The system of claim 1, wherein modifying the portion of 3D video data to generate the 3D model further comprises:
    unifying at least one surface orientation of the portion of 3D video data;
    resolving at least one self-intersection of the portion of 3D video data; and
    removing at least one internal structure of the portion of 3D video data.

4. The system of claim 1, wherein the instructions stored in the memory, upon execution, further cause the system to:
    generate at least one base for the 3D model, wherein generating the at least one base comprises:
        determining a center or a center of gravity of the 3D model; and
        modifying the at least one base based on the determined center or center of gravity.

5. A method for transforming three dimensional (3D) video data into a 3D printable model, the method comprising:
    receiving, by a computing device, 3D video data for 3D printing;
    modifying, by the computing device, a portion of the 3D video data to generate a 3D model, wherein the modifying defines at least one enclosed volume;
    generating at least one base for the 3D model;
    determining a bounding area based on the 3D model;
    modifying the at least one base based on the determined bounding area;
    re-orienting, by the computing device, the at least one enclosed volume of the 3D model based at least on a capability of a 3D printing device; and
    transmitting the 3D model to the 3D printing device for generating at least one 3D object; and
    directing the 3D printer device to print the at least one 3D object according to the 3D model.

6. The method of claim 5, wherein the 3D video data is received in response to a selection of a video frame of the 3D video data.

7. The method of claim 5, wherein modifying the portion of the 3D video data further comprises at least one of:
    unifying at least one surface orientation of the 3D video data;
    resolving at least one self-intersection of the 3D video data; or
    removing at least one internal structure of the 3D video data.

8. The method of claim 5, wherein modifying the portion of the 3D video data to generate the 3D model further comprises at least one of:
    stitching one or more triangles of the 3D video data;
    closing at least one hole in the 3D video data;
    removing at least one double-triangle in the 3D video data;
    adjusting at least one flipped triangle in the 3D video data;
    wrapping the 3D video data; or removing at least one degenerated face or shell from the 3D video data; and translating and transforming the 3D video data for 3D printing.

9. The method of claim 5, further comprising:

applying at least one filter to the 3D model or modifying lighting information associated with the 3D video data.

10. The method of claim 5, wherein generating the at least one base further comprises:

determining a center or a center of gravity of the 3D model; and modifying the at least one base based on the determined center or center of gravity.

11. The method of claim 10, wherein modifying the at least one base based on the determined center or center of gravity further comprises at least one of:

positioning the at least one base relative to the 3D model based on the determined center or center of gravity;

modifying a shape of the at least one base based on the determined center or center of gravity; or modifying at least one dimension of the at least one base based on the determined center or center of gravity.

12. The method of claim 5, wherein modifying the at least one base based on the determined bounding area further comprises:

positioning the at least one base relative to the 3D model based on the determined bounding area;

modifying a shape of the at least one base based on the determined bounding area; or modifying at least one dimension of the at least one base based on the determined bounding area.

13. The method of claim 5, wherein generating the 3D model further comprises:

identifying tag information associated with the 3D video data; and generating the 3D model based on a predefined model associated with the tag information.

14. The method of claim 5, further comprising:

generating one or more support structures for the at least one enclosed volume.

15. The method of claim 5, further comprising:

converting the 3D model to a shell structure comprising a plurality of walls; and removing at least a portion of the 3D model located within the plurality of walls.

16. The method of claim 15, further comprising:

modifying at least a portion of one of the plurality of walls of the shell structure to at least one of:

minimize an amount of material required to 3D print the 3D model; or re-enforce a weak portion of the shell structure.

17. The method of claim 5, further comprising augmenting the 3D video data.

18. The method of claim 5, wherein the bounding area is determined based, at least in part, on dimensions of the 3D video.

19. A computer readable storage medium having stored thereon instructions that, upon execution by at least one processor, cause a computing device to perform operations comprising:

receiving 3D video data for 3D printing;

modifying a portion of the 3D video data to generate a 3D model, wherein the modifying defines at least one enclosed volume;

generating at least one base for the 3D model;

determining a bounding area based on the 3D model;

modifying the at least one base based on the determined bounding area;

re-orienting the at least one enclosed volume based on at least one capability of a 3D printing device;

transmitting the 3D model to the 3D printing device for generating at least one 3D object; and directing the 3D printer device to print the at least one 3D object according to the 3D model.

20. The computer readable storage medium of claim 19, wherein the instructions, upon execution, cause the computing device to perform the additional operations of:

instantiating a user interface configured to render the 3D video data; and receiving a selection of the 3D video data for 3D printing via the user interface.

* * * * *

UNITED STATES PATENT AND TRADEMARK OFFICE
CERTIFICATE OF CORRECTION

PATENT NO. : 10,394,221 B2  
APPLICATION NO. : 15/235514  
DATED : August 27, 2019  
INVENTOR(S) : Kristofer N. Iverson et al.

Page 1 of 4

It is certified that error appears in the above-identified patent and that said Letters Patent is hereby corrected as shown below:

On the Title Page

Under abstract "20 Claims, 9 Drawing Sheets" should read --22 Claims, 9 Drawing Sheets--.

In the Claims

Column 17, Line 50-Column 20, Line 41, (approx.), should read:
--1. A system for transforming three dimensional (3D) video data into a 3D printable model, the system comprising:
a processor; and
memory storing instructions, that when executed by the processor, cause the system to:
receive a selection of 3D video data for 3D printing;
identify at least one capability of a 3D printing device;
modify a portion of the selected 3D video data to generate a 3D model, wherein the modifying defines at least one enclosed volume;
generate at least one base for the 3D model;
determine a bounding area based on the 3D model;
modify the at least one base based on the determined bounding area;
re-orient the at least one enclosed volume of the 3D model based on the least one capability of a 3D printing device; and
transmit the 3D model to a 3D printing device for generating at least one 3D object; and
direct the 3D printing device to print the at least one 3D object according to the 3D model.

2. The system of claim 1, wherein the instructions stored in the memory, upon execution, further cause the system to:
instantiate a user interface configured to render the 3D video data; and
receive the selection of the 3D video data through the user interface.

3. The system of claim 1, wherein modifying the portion of 3D video data to generate the 3D model further comprises:

Signed and Sealed this  
Fourteenth Day of April, 2020

Andrei Iancu  
*Director of the United States Patent and Trademark Office* unifying at least one surface orientation of the portion of 3D video data;
resolving at least one self-intersection of the portion of 3D video data; and
removing at least one internal structure of the portion of 3D video data.

4. The system of claim 1, wherein the instructions stored in the memory, upon execution, further cause the system to:
generate at least one base for the 3D model, wherein generating the at least one base comprises:
determining a center or a center of gravity of the 3D model; and
modifying the at least one base based on the determined center or center of gravity.

5. A method for transforming three dimensional (3D) video data into a 3D printable model, the method comprising:
receiving, by a computing device, 3D video data for 3D printing;
modifying, by the computing device, a portion of the 3D video data to generate a 3D model, wherein the modifying defines at least one enclosed volume;
generating at least one base for the 3D model;
determining a bounding area based on the 3D model;
modifying the at least one base based on the determined bounding area;
re-orienting, by the computing device, the at least one enclosed volume of the 3D model based at least on a capability of a 3D printing device; and
transmitting the 3D model to the 3D printing device for generating at least one 3D object; and
directing the 3D printing device to print the at least one 3D object according to the 3D model.

6. The method of claim 5, wherein the 3D video data is received in response to a selection of a video frame of the 3D video data.

7. The method of claim 5, wherein modifying the portion of the 3D video data further comprises at least one of:
unifying at least one surface orientation of the 3D video data;
resolving at least one self-intersection of the 3D video data; or
removing at least one internal structure of the 3D video data.

8. The method of claim 5, wherein modifying the portion of the 3D video data to generate the 3D model further comprises at least one of:
stitching one or more triangles of the 3D video data;
closing at least one hole in the 3D video data;
removing at least one double-triangle in the 3D video data;
adjusting at least one flipped triangle in the 3D video data;
wrapping the 3D video data; or
removing at least one degenerated face or shell from the 3D video data; and
translating and transforming the 3D video data for 3D printing.

9. The method of claim 5, further comprising:
applying at least one filter to the 3D model or modifying lighting information associated with the 3D video data.

10. The method of claim 5, further comprising:
determining a center or a center of gravity of the 3D model; and
modifying at least one base based on the determined center or center of gravity.

11. The method of claim 5, wherein generating the at least one base further comprises:
determining a center or a center of gravity of the 3D model; and
modifying the at least one base based on the determined center or center of gravity.

12. The method of claim 11, wherein modifying the at least one base based on the determined center or center of gravity further comprises at least one of:
positioning the at least one base relative to the 3D model based on the determined center or center of gravity;
modifying a shape of the at least one base based on the determined center or center of gravity; or
modifying at least one dimension of the at least one base based on the determined center or center of gravity.

13. The method of claim 10, wherein generating the at least one base further comprises:
determining a bounding area based on the 3D model; and
modifying the at least one base based on the determined bounding area.

14. The method of claim 5, wherein modifying the at least one base based on the determined bounding area further comprises:
positioning the at least one base relative to the 3D model based on the determined bounding area;
modifying a shape of the at least one base based on the determined bounding area; or
modifying at least one dimension of the at least one base based on the determined bounding area.

15. The method of claim 5, wherein generating the 3D model further comprises:
identifying tag information associated with the 3D video data; and
generating the 3D model based on a predefined model associated with the tag information.

16. The method of claim 5, further comprising:
generating one or more support structures for the at least one enclosed volume.

17. The method of claim 5, further comprising:
converting the 3D model to a shell structure comprising a plurality of walls; and
removing at least a portion of the 3D model located within the plurality of walls.

18. The method of claim 17, further comprising:
modifying at least a portion of one of the plurality of walls of the shell structure to at least one of:
minimize an amount of material required to 3D print the 3D model; or
re-enforce a weak portion of the shell structure.

19. A computer readable storage medium having stored thereon instructions that, upon execution by at least one processor, cause a computing device to perform operations comprising:
receiving 3D video data for 3D printing;

modifying a portion of the 3D video data to generate a 3D model, wherein the modifying defines at least one enclosed volume;
generating at least one base for the 3D model;
determining a bounding area based on the 3D model;
modifying the at least one base based on the determined bounding area;
re-orienting the at least one enclosed volume based on at least one capability of a 3D printing device;
transmitting the 3D model to the 3D printing device for generating at least one 3D object; and
directing the 3D printing device to print the at least one 3D object according to the 3D model.

20. The computer readable storage medium of claim 19, wherein the instructions, upon execution, cause the computing device to perform the additional operations of:
instantiating a user interface configured to render the 3D video data; and
receiving a selection of the 3D video data for 3D printing via the user interface.

21. The method of claim 5, further comprising augmenting the 3D video data

22. The method of claim 5, wherein the bounding area is determined based, at least in part, on dimensions of the 3D video.--.